United States Patent [19]

Ross et al.

[11] 3,876,700

[45] Apr. 8, 1975

[54] HALOGEN SUBSTITUTED DIALKYLAMINOACYLANILIDES

[75] Inventors: Svante Bertil Ross, Sodertalje; Rune Verner Sandberg, Jarna; Berndt Olof Harald Sjoberg; Sven Bengt Arvid Akerman, both of Sodertalje, all of Sweden

[73] Assignee: Aktiebolaget Astra, Sodertalje, Sweden

[22] Filed: Nov. 8, 1968

[21] Appl. No.: 774,527

[30] Foreign Application Priority Data
Nov. 23, 1967 Sweden.............................. 16125/67

[52] U.S. Cl........... 260/562 N; 260/562 B; 424/324
[51] Int. Cl........................................... C07c 103/50
[58] Field of Search.................................... 260/562

[56] References Cited
OTHER PUBLICATIONS

Beksha et al., J. Org. Chem. USSR, Vol. 1 pp. 1873–1878 (1965).
Blatt, Organic Synthesis, Collective Vol. II, pp. 91–93 (1943).

Primary Examiner—Harry I. Moatz
Attorney, Agent, or Firm—Brumbaugh, Graves, Donohue & Raymond

[57] ABSTRACT

New dialkylaminoacylanilides substituted with a halogen atom in the dialkylamino group are disclosed which are useful as local anesthetics.

5 Claims, No Drawings

HALOGEN SUBSTITUTED DIALKYLAMINOACYLANILIDES

The present invention relates to halogen substituted dialkylamino acylanilides and their salts and also a process for their preparation as well as pharmaceutical preparations thereof, the therapeutic use of such substances and pharmaceutical compositions containing at least one of these new compounds.

More particularly the present invention relates to new compounds of the formula

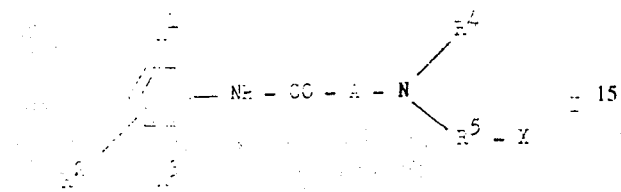

wherein $R^1$, $R^2$ and $R^3$ may be the same or different and each represents a hydrogen or halogen atom, or an alkyl or alkoxy group of at most 3 carbon atoms including isopropyl provided that at most two of $R^1$, $R^2$ and $R^3$ are hydrogen atoms; $R^4$ is methyl or ethyl, $R^5$ is a straight or branched alkylene radical with from 2 to 6 and preferably 4 to 6 carbon atoms; A is a straight or branched alkylene radical having from 1 to 3 carbon atoms; X is a halogen atom selected from the class consisting of chlorine, bromine, and iodine; and therapeutically acceptable salts thereof, a process for their preparation, pharmaceutical compositions containing such compounds, and their use as local anesthetics.

Illustrative examples of compounds of the present invention are the following: N-methyl-N-[3'-chloropropyl]aminoaceto-2,6-xylidide, N-methyl-N-[5'-bromopentyl]aminoaceto-2,6-xylidide, N-ethyl-N-[2'-chloropropyl]β-aminopropio-2,6-xylidide, N-methyl-N-[4'-chlorobutyl]aminoaceto-o-chloroanilide, N-methyl-N-[5'-chloropentyl]aminoaceto-o-ethylanilide, N-methyl-N-[5'-chloropentyl]aminoaceto-o-propylanilide, N-methyl-N-[4'-chlorobutyl]aminoaceto-p-toluidide, N-methyl-N-[4'-chlorobutyl]aminoaceto-2-chloro-6-methylanilide and N-methyl-N-[5'-chloropentyl]aminoaceto-o-methoxyanilide.

The acid addition salts of the compounds according to the present invention are valuable local anesthetics and they are in particular useful as long-acting local anesthetics. One possible explanation to this surprising and very useful property may be that these substances penetrate in the body tissues and are transported to the nervous membranes in the tertiary amine form whereafter the amino group

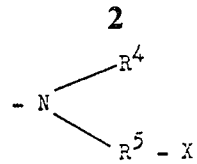

cyclizes to the formation of a N-heterocyclic quaternary ammonium compound which is not easily removed from the nervous cell membrane.

The compounds of the present invention are prepared by reacting a compound of the formula

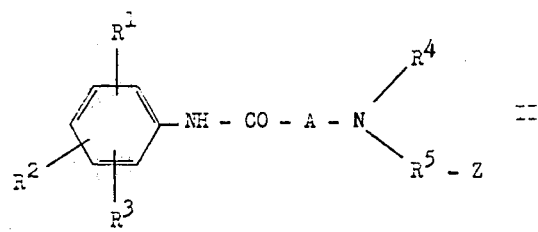

wherein $R^1$, $R^2$, $R^3$, $R^4$, $R^5$ and A have the same meaning as above and Z is a member of the group consisting of hydroxy and acyloxy having not more than 6 carbon atoms, with a halogenating agent, such as a thionyl halogenide or a hydrohalogenic acid, during which reaction or in close connection thereto the compound of the formula I thus formed is converted to the desired therapeutically acceptable salt by reaction with the appropriate acid or transformed to such a salt by metathesis in a suitable solvent.

The expression "therapeutically acceptable salt" is recognized in the art as an acid addition salt, which is physiologically innocuous when administered in a dosage and dose interval (e.g. frequency of administration) that is effective for the indicated therapeutic use of the parent compound. Typical therapeutically acceptable acid addition salts of the compounds of formula I include but are not limited to the salts of mineral acids, such as hydrochloric, hydrobromid, phosphoric or sulphuric acid, or organic acids such as lactic, levulinic, citric, fumaric, maleic, succinic, tartaric, benzoic acid and sulphonic acids, such as methane sulphonic acid and sulphamic acid.

Starting material of the formula II may be prepared by either of the following two methods:

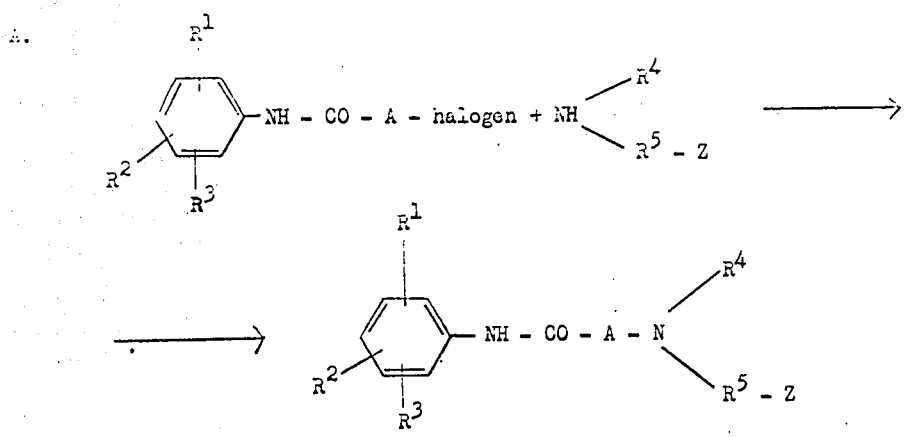

E.

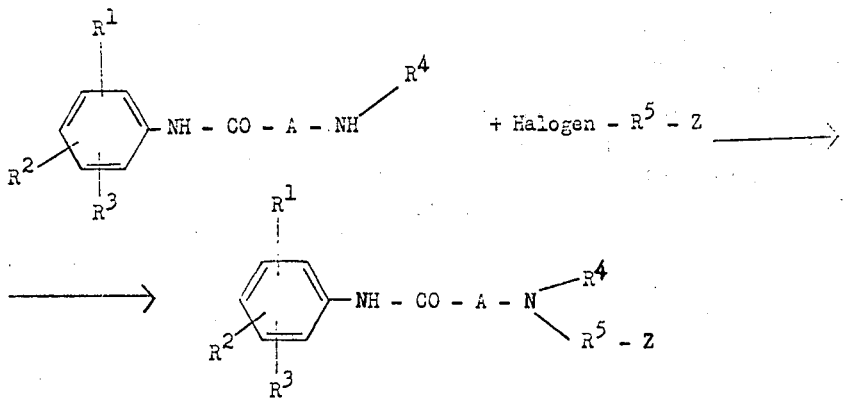

When using method B in some cases a cyclization of the halogen alcohol compound will occur and in such cases preferably a compound wherein Z is an acyloxy group should be used. Chloro pentanol for instance readily cyclizes to tetrahydropyran and instead an ester such as chloropentanol acetate should be chosen for the reaction. The acyloxy group can easily be removed by transesterification with for instance methanol or the acyl compound may be directly halogenated to the corresponding halogen derivative. For a further understanding of this invention references may be given to the following examples.

Example 1. Preparation of N-alkyl-N-[hydroxyalkyl]aminoacylanilides used as starting materials.

Method A.

N-Methyl-N-[4'-hydroxybutyl]aminoaceto-2,6-xylidide.

A mixture of chloroaceto-2,6-xylidide, N-methylaminobutanol and triethylamine, 0,1 mole of each in 250 ml of benzene, was refluxed for 5 hours. After cooling the reaction mixture was treated with water, the benzene layer separated and the aqueous layer extracted once with ether. The combined, organic solutions were dried over potassium carbonate. The product was isolated as hydrochloride, m.p. 162°–4.5°C (from ethanol/ethyl acetate). Yield 48%.

| Analyses: | Calculated: | Equivalent weight: | 300.9, | N 9.32 %. |
|---|---|---|---|---|
| | Found: | Equivalent weight: | 301, | N 9.17 %. |

N-Methyl-N-[6'-hydroxyhexyl]aminoaceto-2,6-xylidide was prepared in the same way using N-methylaminohexanol. Yield 47% of free base, $b_{0.02}$ 160°–70°C.

| Calculated: | Equivalent weight: | 292.4, | N 9.58 %. |
|---|---|---|---|
| Found: | Equivalent weight: | 289, | N 9.60 %. |

β-(N-Methyl-N-[4'-hydroxybutyl]amino)-propio-2,6-xylidide and β-(N-ethyl-N-[2'-hydroxyethyl]amino)-propio-2,6-xylidide were prepared in the same way from β-chloropropio-2,6-xylidide and N-methylaminobutanol respectively N-ethylaminoethanol. These compounds readily decompose at distillation and the crude products were used for the next step without purification.

N-Methyl-N-[2'-hydroxyethyl]aminoaceto-2,6-xylidide is earlier described by Lovgren et al. (Svensk Kem. Tidskrift 1946, 323).

Method B.

N-Methyl-N-[3'-hydroxypropyl]aminoaceto-2,6-xylidide.

Equimolecular amounts of N-methylamino aceto-2,6-xylidide and chloropropanol were refluxed in xylene solution with a slight excess of sodium carbonate for 60 hours. The solution was filtered by suction, the solvent evaporated and the residue fractionated in vacuo. Yield 40% of product, $b_{0.01}$ 152°–4°C. Hydrochloride m.p. 167°–170°C.

| Calculated: | Equivalent weight: | 250.4, | N 11.19 %. |
|---|---|---|---|
| Found: | Equivalent weight: | 255, | N 11.1 %. |

N-Methyl-N-[5'-acetoxypentyl]aminoaceto-2,6-xylidide was prepared in the same way from chloropentylacetate and methylamino aceto-2,6-xylidide. Yield 31% of product, $b_{0.02}$ 185°C, $n_D^{25}$ 1.5148.

| Calculated: | Equivalent weight: | 320.4, | N 8.76 %. |
|---|---|---|---|
| Found: | Equivalent weight: | 318, | N 8.78 %. |

N-Methyl-N-[5'-hydroxypentyl]aminoaceto-2,6-xylidide.

A solution of 10 g (0.031 mole) of the acetyl compound and 7.6 g (0.040 mole) of p-toluenesulphonic acid monohydrate in 100 ml of absolute alcohol was refluxed for 15 hours. The solvent was evaporated, the residue dissolved in water and this solution made slightly alkaline. The base was extracted repeatedly with ether, the extracts dried over MgSO$_4$ and distilled. yield 5.5 g (63.5%) of oil, $b_{0.05}$ 171°–3°C, $n_D^{25}$ 1.5292. Calculated: N 10.05%; Found N 10.0%.

Example 2. Conversion of the aminoalcohols to corresponding chloro compounds.

A mixture of 0.015 mole of the hydrochloride of the aminoalcohol and 0.030 mole of thionylchloride in 100 ml of chloroform was refluxed for 20 hours whereupon the solvent was evaporated. Usually the residual hydrochloride was directly recrystallized. In two cases it was found more suitable to purify the product as free base.

Compounds prepared in analogous way and represented by the formula

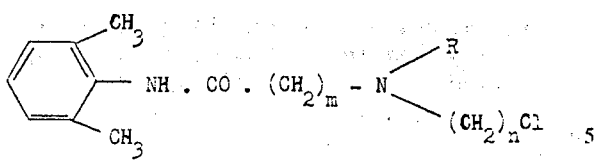

are listed in the following Table 1.

good frequency of block and in particular a long duration of action.

In the following Table 2 some of the compounds of the present invention are compared with lidocaine and tetracaine according to accepted methods for testing excitation block in vitro and in vivo and toxicity. The compounds tested are represented by the formula Table 1

| R | m | n | Yield % | M.P.°C | Solvent for recryst. | Formula | Analyses Calc. Equiv. w. | Calc. N % | Found Equiv. w. | Found N % |
|---|---|---|---|---|---|---|---|---|---|---|
| $CH_3$ | 1 | 2 | 62 | 65.5–7 | light petrol | $C_{13}H_{19}N_2OCl$ | 254.8 | 11.0 | 257 | 11.0 |
| $CH_3$ | 1 | 3 | 63.5 | 115.5–7.5 | ligroin | $C_{14}H_{21}N_2OCl$ | 268.8 | 10.43 | 270 | 10.4 |
| $CH_3$ | 1 | 4 | 67 | 149–52 | acetonitrile | $C_{15}H_{23}N_2OCl \times HCl$ | 319.3 | 8.78 | 308 | 8.53 |
| $CH_3$ | 1 | 5 | 75 | 142–4.5 | methyl-iso-butylketone | $C_{16}H_{25}N_2OCl \times HCl$ | 333.3 | 8.41 | 332 | 8.25 |
| $CH_3$ | 1 | 6 | 92 | 140–3 | methylpropyl-ketone | $C_{17}H_{27}N_2OCl \times HCl$ | 347.3 | 8.07 | 349 | 8.00 |
| $CH_3$ | 2 | 4 | 12[*] | 120–3 | methyl-iso-butylketone | $C_{16}H_{25}N_2OCl \times HCl$ | 333.3 | 8.41 | 331 | 8.47 |
| $C_2H_5$ | 1 | 2 | 75 | 152(d) | pentanone-2 | $C_{14}H_{21}N_2OCl \times HCl$ | 305.3 | 9.18 | 310 | 9.12 |
| $C_2H_5$ | 2 | 2 | 13[*] | 158–60 | acetonitrile | $C_{15}H_{23}N_2OCl \times HCl$ | 319.3 | 8.78 | 321 | 8.62 |

[*] over all yield, computation based on starting material of stage A.

In analogous way the maleate of N-methyl-N-[5'-chloropentyl]aminoaceto-o-methoxyanilide was prepared. After recrystallization from ethyl acetate the product melted at 85°–88°C. Calculated equiv. weight 414.9, N 6.75%; found equiv. weight 417, N 6.81%.

Example 3.

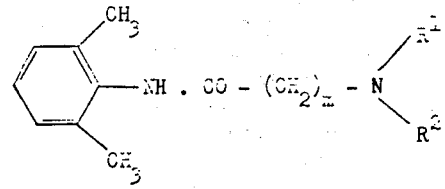

Table 2

| m | $R^1$ | $R^2$ | Intravenous toxicity $LD_{50}$ in mg free base per kg body weight (mouse) | Blocking effect | | Guinea-pig sciatic nerve block in vivo (relative duration) | Remarks |
|---|---|---|---|---|---|---|---|
| | | | | Isolated frog sciatic nerve[1] | | | |
| | | | | Rel.eff. at 5 min. | Rel duration | | |
| — | — | — | 6 | >1.0 | >1.0 | >1.0 | Tetracaine standard long action anesthetic |
| 1 | $-C_2H_5$ | $-C_2H_5$ | 25 | 1.0 | 1.0 | 1.0 | Lidocaine |
| 1 | $-(CH_2)_3Cl$ | $-CH_3$ | 36 | 1.0 | >1.0 | 1.0 | |
| 1 | $-(CH_2)_4Cl$ | $-CH_3$ | 13 | 0.7 | >>1.0 | >>1.0 | |
| 1 | $-(CH_2)_5Cl$ | $-CH_3$ | 19 | 0.9 | >>1.0 | >>1.0 | |
| 1 | $-(CH_2)_6Cl$ | $-CH_3$ | 20 | 0.8 | >>1.0 | >>1.0 | |
| 1 | $-(CH_2)_5Br$ | $-CH_3$ | 11 | 0.8 | >>1.0 | >>1.0 | |
| 2 | $-(CH_2)_4Cl$ | $-CH_3$ | 19 | 0.4 | >1.0 | >1.0 | |
| 1 | $-(CH_2)_2Cl$ | $-C_2H_5$ | 32 | 0.8 | 1.0 | >>1.0 | |

[1] A. Mauro, A.P. Truant and E.L. Mc Cawley, Yale J. Biol. Med. 21 (1948) 113.

N-methyl-N-[5'-bromopentyl]aminoaceto-2,6-xylidide.

5,6 g of N-methyl-N-[5'-acetoxypentyl]aminoaceto-2,6-xylidide were dissolved in 150 ml of glacial acetic acid containing 30 g of hydrogen bromide and the mixture left at 90°C for 24 hours. Another 30 g of dry hydrogen bromide was passed into the solution and the heating continued at 90°C for 24 hours more. The solvent was evaporated and the crystalline residue treated with acetone. The bromo-compound was sucked off and washed with ether. Yield 6 g with m.p. 154°–158°C. Two recrystallisations from pentanone-3 raised the m.p. to 158.5°–160°C. Calculated Br 37.8%; Found Br 37.5%.

The compounds of the instant invention display excellent local anesthetic properties such as rapid onset, The compound N-methyl-N-[5'-chloropentyl]-aminoaceto-o-methoxyanilide was tested using the same methods and with the following results.

| Intravenous toxicity $LD_{50}$ in mg free base per kg body weight (mouse) | Blocking effect | | |
|---|---|---|---|
| | Isolated frog sciatic nerve | | Guinea-pig sciatic nerve block in vivo (relative duration) |
| | Rel. eff. at 5 min. | Rel. duration | |
| 86 | 0.6 | 1.0 | ≥1.0 |

The agents were found to compare very well with the known compounds tetracaine and lidocaine. The agents also exhibit a low initiating effect.

These results indicate that the compounds of the present invention provide long acting local anesthetics with toxicity properties superior to those of presently used long acting anesthetics (for example tetracaine). Such a reduction in toxicity without any considerable loss of anesthetic activity means that the gap between the toxic dose and the effective dose has been widened. Thus the safety of local anesthesia has been improved.

We claim:

1. A member selected from the group consisting of compounds of the formula

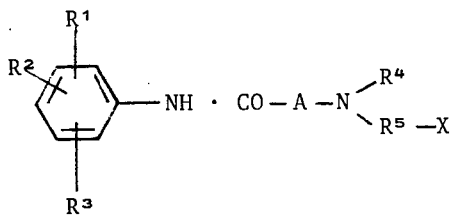

wherein each of R¹, R², and R³ is selected from the group consisting of hydrogen, halogen, alkyl of at most 3 carbon atoms, including isopropyl and alkoxy having not more than 3 carbon atoms, including isopropoxy, provided that at most two of R¹, R², and R³ are hydrogen atoms; R⁴ means methyl or ethyl; R⁵ is an alkylene radical with from 2 to 6, and preferably from 4 to 6, carbon atoms which may be branched; X is a halogen atom from the class consisting of chlorine, bromine, and iodine; and A is a member of the group consisting of straight and branched alkylene radicals having from 1 to 3 carbon atoms; and therapeutically acceptable salts thereof.

2. A compound according to claim 1 of the formula

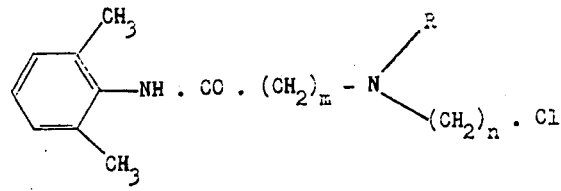

wherein $m$ is an integer from 1 to 2 inclusive; $n$ is an integer from 2 to 6 inclusive; and R is selected from the class consisting of methyl and ethyl.

3. The compound

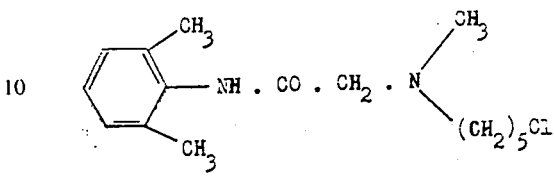

4. The compound

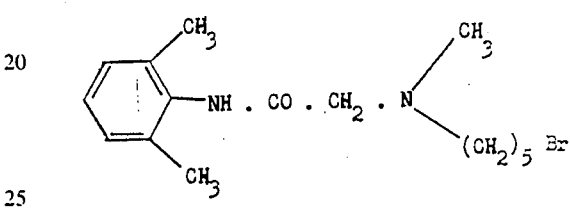

5. A member selected from the group consisting of a compound of the formula

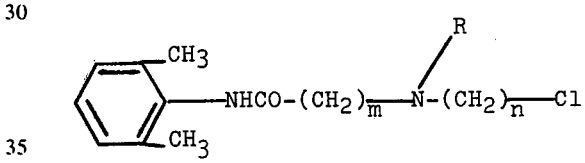

wherein $m$ is an integer from 1 to 2 inclusive; $n$ is an integer from 2 to 6 inclusive; and R is selected from the class consisting of methyl and ethyl; and the therapeutically acceptable salts thereof.

* * * * *